Patented Feb. 25, 1941

2,233,038

UNITED STATES PATENT OFFICE 2,233,038

DIAZOTYPE PROCESS

Oskar Süs and Maximilian Paul Schmidt, Wiesbaden-Biebrich, Germany, assignors to Kalle & Co. Aktiengesellschaft, Wiesbaden-Biebrich, Germany No Drawing. Application November 9, 1939, Serial No. 303,544. In Germany November 17, 1938

15 Claims. (Cl. 95—6)

The present invention relates to the diazotype photoprinting process.

One object of the invention is to produce new azo components which are particularly well suitable for diazotype purposes. Another object of the invention is the production of light sensitive layers which contain the said azo components besides a diazo compound. Further objects of the invention will be seen from the following description.

I have found that hydroxynaphthoic acid alkyl amides that is hydroxynaphthoic acid amides carrying in the amido group an alkyl radical as substituent can successfully be used as azo components for diazotype purposes provided that the alkyl radical carries a basic substituent.

Compounds which are derived from beta-hydroxynaphthoic acids, particularly 2.3-hydroxynaphthoic acid, are especially useful.

As basic substituent there is advantageously used an amino group, which may be substituted, for instance by cycloaliphatic radicals or particularly by normal aliphatic radicals. These radicals suitably contain only a small number of carbon atoms, because otherwise the solubility in water of the compounds or the salts thereof is diminished. The coupling components or their salts respectively should be soluble in water to such an extent that a diazotype material treated with an aqueous solution of the azo components gives a very visible picture. In general it is sufficient when the salts dissolve in water, to about 0.5–1 per cent while heating.

Of primary consideration are those compounds in which the alkyl group carrying the basic substituent contains only a low number of carbon atoms. Compounds in which the alkyl group contains two carbon atoms are especially suitable. The alkyl group may, however, contain for instance also 3, 4, 5 or 6 carbon atoms. The basic substituent is preferably bound directly to the alkyl group. Other atoms or atom groups, also hetero-atoms such as O- or S-atoms, may, however, be interposed between the alkyl group and the basic substituent.

The azo components contemplated by the present invention may carry also substituents in the naphthalene nucleus. On introducing substituents care has to be taken that the solubility of the compounds is not essentially reduced. On the other hand such substituents are unsuitable as would lead to a solubility in water of the azo dyestuffs prepared with the aid of the azo components. As substituents there may be used for instance halogens, such as chlorine, alkyl groups or alkoxy groups. On introducing substituents into the naphthalene nucleus care must, of course, also be taken that the compounds remain capable of coupling. In the compounds derived from 2.3-hydroxynaphthoic acid the 1-position must, for example, remain unsubstituted. The alkyl group of the hydroxynaphthoic acid alkyl amides, too, may contain further substituents besides the basic substituent, if the basic properties of the basic substituent are not essentially diminished thereby.

The azo components used according to the present invention are distinguished by the fact that in the form of their salts they possess an excellent solubility in water and in spite of that yield prints possessing good fastness to water. Furthermore it is of practical importance that the new azo components yield dark dyestuffs. Dyestuffs of particularly dark shades are obtained by using compounds which are derived from 2.3-hydroxynaphthoic acid. The shades may be slightly varied by the addition of other azo-components, for instance meta-aminophenol derivatives. It is thus possible to obtain prints having a neutral black shade. The new azo components are used primarily for the preparation of two-component papers, i. e. papers containing diazo compound and azo component. They are suitably used together with the approved amino-diazo compounds, for instance para-amino-diazo compounds. The compounds are also very well suited for sensitizing films. The light-sensitive layers which contain the new azo components are very stable.

The new azo components are prepared for instance by condensing hydroxynaphthoic acid esters with primary alkyl amines which still contain a second basic group, particularly a substituted or unsubstituted amino group. The hydroxynaphthoic acid esters are advantageously caused to react for instance with ethylene diamine, diethylene triamine and similar aliphatic diamines and polyamines. Instead of hydroxynaphthoic acid esters there may be used the hydroxynaphthoic acids themselves as starting materials. Acid chlorides are also very useful. In this case it is not necessary to isolate the acid chlorides; on the contrary, the hydroxynaphthoic acids may directly be caused to react with the basic substances mentioned above in the presence of inorganic acid chlorides, for instance phosphorus trichloride. It is furthermore possible to obtain the azo components by separation of water from the salts of the hydroxynaphthoic acids with the said amines.

The following examples serve to illustrate the invention, but they are not intended to limit it thereto:

1. .8 gram of the hydrochloride of the amino-ethyl-amide of 2.3-hydroxynaphthoic acid

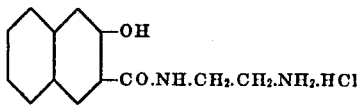

2.5 grams of the diazo compound from 4-amino-1-(N-ethyl-N-benzyl)-aminobenzene, 6 grams of citric acid, 5 grams of thiourea, 2 grams of boric acid and 2 grams of tartaric acid are dissolved in 100 cc. of water. A paper is coated with the solution thus obtained. The prints produced with this photo printing paper are developed with ammonia gas.

The azo component named may be prepared as follows: 40 grams of 2.3-hydroxynaphthoic acid methyl ester are heated for 4 hours to 100° C. together with 30 grams of an aqueous ethylenediamine solution of 77 per cent strength. The reaction product obtained is then extracted with 400 cc. of hot hydrochloric acid of 10 per cent strength. On cooling the hydrochloric acid solution, the hydrochloride of the amino-ethyl-amide of 2.3-hydroxynaphthoic acid crystallizes in a yield of about 75–80 per cent. It may be purified by recrystallizing it from water and it melts at 242° C. Its aqueous solution tends to forming foam. The product may be used not only as azo component for diazo types but also for the preparation of azo dyestuffs for dyeing purposes. Besides it is a useful wetting agent. The free base may be obtained by the reaction of a concentrated aqueous solution of the hydrochloride with sodium bicarbonate solution of 10 per cent strength. It is of a yellowish color and after having been recrystallized from alcohol it melts at 186° C.

2. .7 gram of the hydrochloride of the amino-ethyl-amide of 2.6-hydroxynaphthoic acid, 2 grams of the diazo compound from para-amino-diethyl-aniline, 3 grams of citric acid and 5 grams of thiourea are dissolved in 100 cc. of water. By coating a suitable base with the solution thus obtained a light-sensitive material is obtained.

The afore-named azo component may be obtained from the methyl ester of the 2.6-hydroxynaphthoic acid according to the method described in Example 1. The hydrochloride melts at 262° C. The free base which may be recrystallized from pyridine melts at 226° C.

3. .9 gram of the hydrochloride of the diethyl-amino-ethyl-amide of 2.3-hydroxynaphthoic acid, 1.5 grams of the diazo compound from the para-amino-diphenyl-amine, 5 grams of citric acid, 2 grams of tartaric acid, 2 grams of boric acid and 8 grams of thiourea are dissolved in 100 cc. of water. By painting a paper with the solution thus produced there is obtained a diazo photo printing material.

The afore-named azo component is obtained by heating 40 grams of 2.3-hydroxynaphthoic acid methyl ester with 18 grams of the asymmetric N-diethyl-ethylene-diamine for 4 hours in an oil bath to 100° C. From the hydrochloric acid solution obtained on extracting the reaction mixture with hydrochloric acid the compound is separated by the addition of sodium chloride. After the product which is at first present in the oily condition has crystallized it is recrystallized from alcohol and ether or from water. It melts at 168° C.

4. 40 grams of the 2.3-hydroxynaphthoic acid methyl ester are heated for 4 hours in the oil bath to 100° C. together with 35 grams of diethylene-triamine. The whole is worked up as described in the preceding examples. The base obtained during the reaction which base corresponds to the following formula

crystallizes from its hydrochloric acid solution which has been concentrated in the form of the salt. The recrystallized product melts at 262° C.

1 gram of the compound obtained, 2.5 grams of the diazo compound from the para-amino-dimethyl-aniline, 3 grams of tartaric acid and 5 grams of thiourea are dissolved in 100 cc. of water. This solution is suitable for sensitizing photo printing material.

5. 40 grams of the 2.3-hydroxynaphthoic acid methyl ester are heated for 4 hours in an oil bath to 100° C. together with 42 grams of triethylene-tetramine. The reaction mixture is heated with an excess of hydrochloric acid of 18 per cent strength to violent boiling and then filtered. After the filtrate has been allowed to stand for some time there crystallizes in the form of the hydrochloride the amide produced during the reaction. The melting point is at 282° C. The compound corresponds to the following formula:

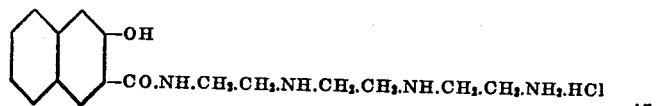

1 gram of this component, 2.5 grams of the diazo compound from para-amino-diethyl-aniline, 7 grams of citric acid, 3 grams of tartaric acid, 3 grams of boric acid and 5 grams of thiourea are dissolved in 100 cc. of water. By coating paper with this solution there is obtained a diazo photo printing material.

6. 52 grams of 2.3-hydroxynaphthoic acid methyl ester and 49.4 grams of hexamethylenediamine are heated for 4 hours in an oil bath to 100° C. The reaction product is mixed with an excess of hydrochloric acid (1 part of concentrated hydrochloric acid, 2 parts of water) and the mixture is heated. After the mixture has been filtered the hydrochloride of amino-hexylamide of the 2.3-hydroxynaphthoic acid separates and may be purified by recrystallizing it from water with the addition of a small quantity of hydrochloric acid. The compound which corresponds to the following formula

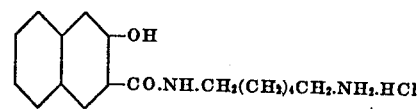

may be used instead of the azo components named in the preceding examples.

7. 3 parts of 2.3-hydroxynaphthoic acid methyl ester are heated for 4 hours to 100° C.

together with 4.5 parts of N-dimethyl-N'-methyl-ethylene-diamine (melting point 165° C.–168° C.) obtained by the reaction of monomethylamine with dimethylamino-chloroethane in an autoclave at 115° C.–120° C. Hydrochloric acid in excess (1 part of concentrated hydrochloric acid for 2 parts of water) is then added to the reaction mixture, the mixture is filtered and the mother liquor is evaporated until crystallization sets in. The compound obtained which corresponds to the following formula

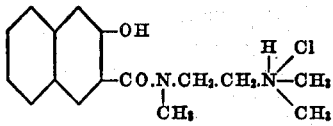

may be used instead of the azo components named in the preceding examples.

8. 50 grams of 6-methoxy-2.3-hydroxynaphthalene-carboxylic acid, 500 cc. of methyl alcohol and 53 cc. of sulfuric acid (concentrated) are heated for 3 hours in an oil bath to 110° C. The methyl ester crystallizes on cooling and is recrystallized from ethyl alcohol, while adding animal charcoal. The melting point is 135° C. 22 grams of the 6-methoxy-2.3-hydroxynaphthalene carboxylic acid methyl ester thus obtained and 16.5 grams of ethylene-diamine are heated for 4 hours to 100° C. 200 cc. of hydrochloric acid (obtained by mixing 1 part of concentrated hydrochloric acid with 2 parts of water) are then added. After boiling, the hydrochloride of the amino-ethyl-amide of 6-methoxy-2.3-hydroxynaphthoic acid crystallizes on cooling; it corresponds to the following formula:

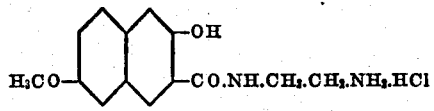

This compound may be used instead of the azo components named in the preceding examples.

We claim:

1. As a new azo component for diazotype purposes a substance corresponding to the following general formula:

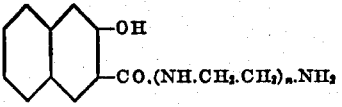

wherein $n$ stands for a number below four.

2. As a new azo component for diazotype purposes the amino-ethyl-amide of 2.3-hydroxynaphthoic acid.

3. As a new azo component for diazotype purposes the amino-hexyl-amide of 2.3-hydroxynaphthoic acid.

4. As a new azo component for diazotype purposes the N-methyl-N-(dimethylamino-ethyl) amide of 2.3-hydroxynaphthoic acid.

5. A light-sensitive material consisting in a sheet support which carries an amino diazo compound and as azo component a hydroxynaphthoic acid alkyl amide in which the alkyl radical carries a basic substituent.

6. A light-sensitive material consisting in a sheet support which carries an amino diazo compound and as azo component a hydroxynaphthoic acid alkyl amide in which the alkyl radical carries an amino group.

7. A light-sensitive material consisting in a sheet support which carries an amino diazo compound and as azo component a beta-hydroxynaphthoic acid alkyl amide in which the alkyl radical carries a basic substituent.

8. A light-sensitive material consisting in a sheet support which carries an amino diazo compound and as azo component a beta-hydroxynaphthoic acid alkyl amide in which the alkyl radical carries an amino group.

9. A light-sensitive material consisting in a sheet support which carries an amino diazo compound and as azo component a 2.3-hydroxynaphthoic acid alkyl amide in which the alkyl radical carries a basic substituent.

10. A light-sensitive material consisting in a sheet support which carries an amino diazo compound and as azo component a 2.3-hydroxynaphthoic acid alkyl amide in which the alkyl radical carries an amino group.

11. A light-sensitive material consisting in a sheet support which carries an amino diazo compound and as azo component a substance corresponding to the following general formula:

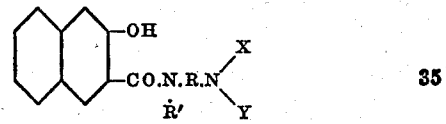

wherein X and Y stand for hydrogen or an alkyl group which may be substituted by an amino group, R stands for an alkyl group and R' for hydrogen or an alkyl group.

12. A light-sensitive material consisting in a sheet support which carries an amino diazo compound and as azo component a substance corresponding to the following general formula:

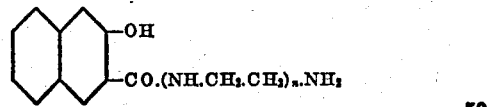

wherein $n$ stands for a number below four.

13. A light-sensitive material consisting in a paper support which carries a para-amino diazo compound and as azo component the amino-ethyl-amide of 2.3-hydroxynaphthoic acid.

14. A light-sensitive material consisting in a paper support which carries a para-amino diazo compound and as azo component the amino-hexyl-amide of 2.3-hydroxynaphthoic acid.

15. A light-sensitive material consisting in a paper support which carries a para-amino diazo compound and as azo component the N-methyl-N-(dimethylamino ethyl) amide of 2.3-hydroxynaphthoic acid.

OSKAR SÜS.
MAXIMILIAN PAUL SCHMIDT.